(No Model.)
R. H. GRAY.
BALING PRESS.
No. 525,203. Patented Aug. 28, 1894.
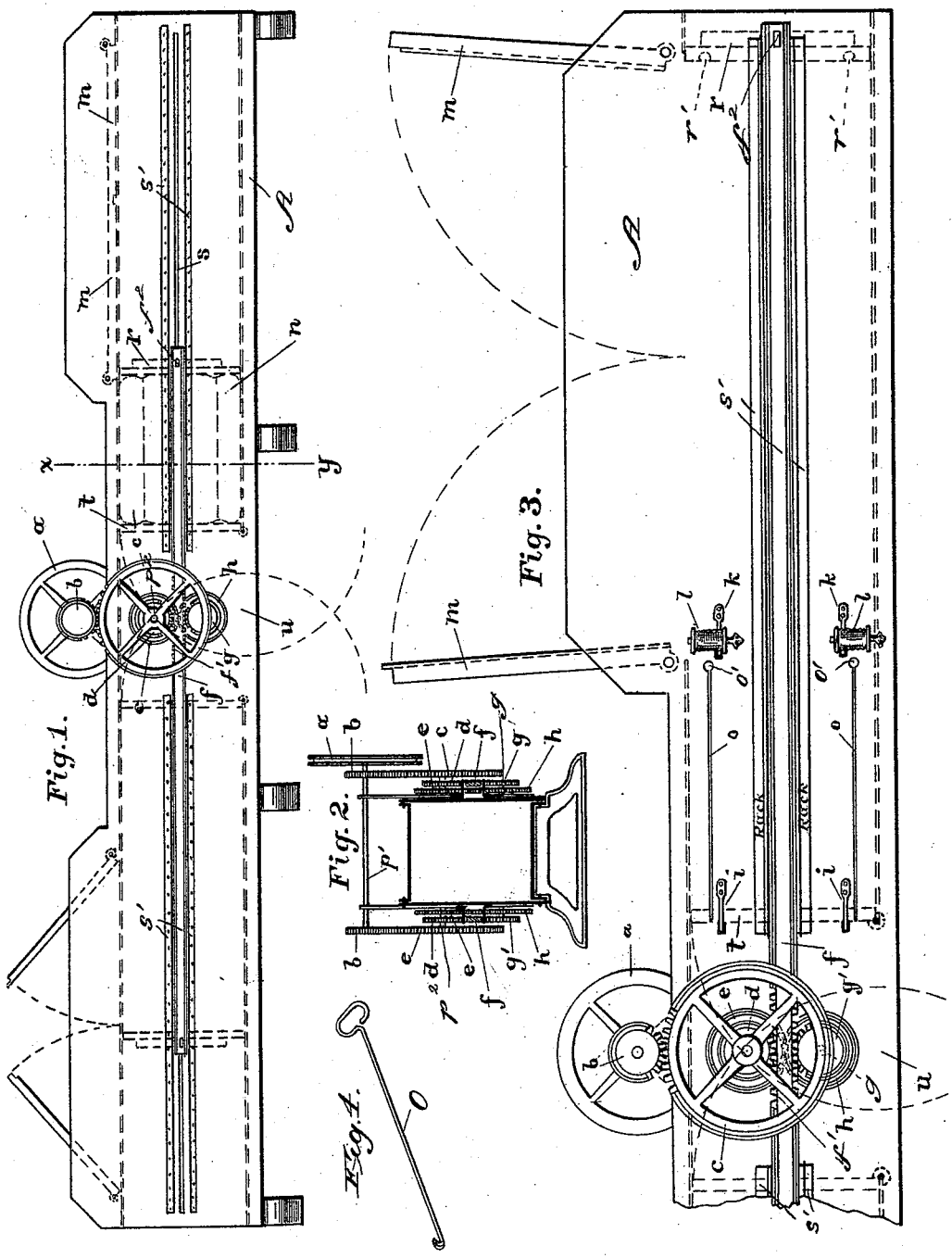
WITNESSES:
P. D. Robinson
Byron Gunner.
INVENTOR
Robert H. Gray
BY
Lynch and Terrell
ATTORNEYS.

UNITED STATES PATENT OFFICE.

ROBERT H. GRAY, OF LEXINGTON, KENTUCKY.

BALING-PRESS.

SPECIFICATION forming part of Letters Patent No. 525,203, dated August 28, 1894.

Application filed April 26, 1894. Serial No. 509,138. (No model.)

*To all whom it may concern:*

Be it known that I, ROBERT H. GRAY, a citizen of the United States, residing at Lexington, in the county of Fayette and State of Kentucky, have invented certain new and useful Improvements in Baling-Presses; and I do hereby declare the following to be a full, clear, and exact description of the invention, such as will enable others skilled in the art to which it appertains to make and use the same.

My invention relates to baling presses for use in baling cotton, hay and similar products which it is desirable to compress into compact form in order that they may be handled with greater convenience during transportation.

My improved press belongs to that class which employs a rack-bar which carries the compression heads and is operated by a pinion which is driven by any suitable power.

My improved press has for its object to provide a baling mechanism which is simple in construction, efficacious in operation, and which is of such construction as to accomplish a greater amount of work for a minimum amount of labor than many of the presses now upon the market.

Other numerous advantages will be set forth in the following description and particularly pointed out in the claims appended hereto.

In the drawings Figure 1 is a side elevation of my improved press. Fig. 2 is an end view thereof. Fig. 3 is an enlarged view of one end of the press and the operating mechanism. Fig. 4 is a detail view to be referred to hereinafter.

A denotes the body or box of the press which I preferably construct of sheet metal for the sake of lightness and compactness, since a press so constructed when taken apart may be packed in a very small compass and is therefore very convenient of transportation. At each end of box A in the top thereof, are trap doors $m$ hinged to the sides of the box at their outer ends and arranged to swing upwardly to uncover the feed openings to the compression chambers. In each side of the press box A are slots $s$ extending from a point near the center of box A nearly to the ends thereof. On either side of slots $s$ are secured flanges $s'$ which form guideways for the rack-bars $f$, of which there are two, one on each side of the press, said bars $f$ being provided with teeth $f'$ on their edges. Secured to each end of bars $f$ by lugs $f^2$ passing through slots $s$ are pressure heads $r$ which are of a size to nearly fill the compression chamber but which move freely therein as the rack-bars $f$ are reciprocated.

Mounted on vertical supports $p$ at the center of box A is a horizontal shaft $p'$ which has a driving pulley $a$ at one end to which power is applied. Two pinions $b$, $b$, are carried by said shaft $p'$ which pinions engage gear wheels $c$, $c$, mounted on a shaft $p^2$, below, and in line with, shaft $p'$. The shaft $p^2$ carries two pinions $d$, $d$, which engage the teeth $f'$ on the upper edge of rack-bars $f$. Said shaft $p^2$ carries two second gear wheels $e$, $e$, which engage gear wheels $h$, $h$, on a third shaft $g$ and drive the latter. At the outer ends of said shaft $g$ are two pinions $g'$, $g'$, which engage the teeth $f'$ on the under side of rack-bars $f$. It will be seen that through this train of gearing, motion is imparted to the rack-bars $f$ and the pressure heads $r$ when power is applied to the driving pulley $a$.

The inner ends of the two compression chambers of the press are closed by means of swinging heads $t$, $t$, which are pivoted to the sides of the press box A and are adapted to swing downwardly through an opening in the bottom of the box A beneath the driving gearing, as indicated in dotted lines in Fig. 1. Said heads $t$, $t$, are held in their upright positions by means of spring catches $i$, $i$, attached to the sides of the box A and projecting through openings therein, and when said catches $i$, $i$, are thrown from their normal positions of engagement with said heads the latter can be swung on their pivots. To hold the pressure head $r$ in its inner position while the bale is being tied I provide spring catches $k$, $k$, which snap behind said head when it reaches the proper point and hold it until the proper tying of the bale is completed.

To provide for the proper tying of the bale with wire or other binders I use the devices which I will now describe. On the sides of the box A, near the top and bottom thereof I mount two wire carrying spools $l$, $l$, on suitable brackets, and in line with each of these spools $l$, $l$, I form slots $o$, $o$, in the sides of the box A, said slots terminating in holes $o'$ $o'$ at their ends nearest the spools $l, l$. Through the holes $o', o'$, the wires carried by spools $l, l$, are passed and their free ends secured temporarily on the opposite side on the box A. It will be apparent therefore that these wires pass across the compression chambers at a point just inside the feed opening to the chambers. The holes $o', o'$, are of a size to admit the tool O shown in Fig. 4, to be passed through the press box A so that its hooked end may engage the binding wires and draw them through when the pressure head $r$ has reached its inner position and the bale is formed, said head having slots or recesses $r'$ formed in its inner face which register with holes $o', o'$.

Having described the construction of the several parts of my improved press I will now set forth briefly the operation of the same. The binding wires having been properly arranged across the compression chamber, the rack-bars and their pressure heads are thrown to a position so that one of said heads will lie just outside the feed opening to one of the compression chambers. The trap doors which close said feed opening are thrown up and the material to be baled is thrown into the compression chamber. Power is then applied to the driving pulley and is transmitted to the rack-bars through the gearing described thus causing the pressure head to move into the chamber and compress the material. As the material is forced toward the pivoted head $t$ the binding wires are carried along the slots $o, o$, by the bale under process of formation. When the pressure head has reached the point where the slots on its inner face register with the holes $o', o'$, the spring catches $k, k$, snap into place behind the same and the gearing and power shaft are relieved of all strain. The tool O shown in Fig. 4 is now passed through holes $o', o'$, and slots or recesses $r'$ in the pressure head and sufficient wire is drawn through the box to form a complete band around the bale. The ends of the wires having been tied the pivoted head $t$ is released. The driving mechanism is again started and the finished bale is forced out and drops through the central opening in the bottom of the box A.

It will be obvious that as one of the pressure heads is forming a bale the other is being forced to its outer position so that when one bale is completed the opposite end of the press is in readiness to receive material for another bale.

The simplicity of construction and operation of my improved press is apparent and its advantages over presses of similar character are numerous.

Having thus described my invention, I claim and desire to secure by Letters Patent—

1. In a baling press of the class described, the combination with a press box having a compression chamber at each end, of rack bars mounted in guideways on either side of said press box, pressure heads carried by said rack bars and adapted to act alternately on the material in the compression chambers, movable heads pivoted to the sides of the press box at the inner ends of the compression chambers, a central delivery opening in the bottom of said press box through which the pivoted heads swing, and mechanism for reciprocating said rack bars and pressure heads, substantially as described.

2. In a baling press of the class described, the combination with a press box, having a compression chamber at either end, said chambers being provided with feed openings, guideways on the sides of said press box, rack-bars mounted in said guideways, pressure heads carried by said rack-bars, movable heads at the inner ends of said compression chambers, catches for holding said latter in an upright position, catches for holding said pressure heads in their inner positions and means for reciprocating said rack-bars and pressure heads, substantially as described.

In testimony whereof I affix my signature in presence of two witnesses.

ROBERT H. GRAY.

Witnesses:
J. M. PARKS,
J. B. MORTON.